US012519908B2

(12) United States Patent
Lucas et al.

(10) Patent No.: US 12,519,908 B2
(45) Date of Patent: *Jan. 6, 2026

(54) INTERACTION MANAGEMENT SYSTEM FOR MULTIPLE KIOSK DEVICES AND MULTIPLE VIRTUAL RECEPTIONIST DEVICES

(71) Applicant: Mill Mountain Technologies, Roanoke, VA (US)

(72) Inventors: Wendy T. Lucas, Roanoke, VA (US); Mark S. Lucas, Roanoke, VA (US); Josh A. Amos, Salem, VA (US); Timothy J. Eichblatt, Roanoke, VA (US)

(73) Assignee: Mill Mountain Technologies, Roanoke, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/350,994

(22) Filed: Jul. 12, 2023

(65) Prior Publication Data

US 2023/0353712 A1 Nov. 2, 2023

Related U.S. Application Data

(63) Continuation of application No. 17/936,015, filed on Sep. 28, 2022, now Pat. No. 11,743,432.
(Continued)

(51) Int. Cl.
*H04N 7/18* (2006.01)
*G06Q 20/18* (2012.01)
(Continued)

(52) U.S. Cl.
CPC ............. *H04N 7/181* (2013.01); *G06Q 20/18* (2013.01); *G06Q 30/0281* (2013.01);
(Continued)

(58) Field of Classification Search
CPC ............... H04N 7/181; H04N 1/00225; H04N 1/00244; H04N 2201/0074; G06Q 20/18;
(Continued)

(56) References Cited

U.S. PATENT DOCUMENTS 6,731,609 B1 * 5/2004 Hirni ................... H04L 12/1813
370/260
8,629,755 B2 1/2014 Hashim-Waris
(Continued)

FOREIGN PATENT DOCUMENTS

WO 2013098790 7/2013
WO 2014063162 4/2014

OTHER PUBLICATIONS

Swipedon, "Visitor Management System", online at <URL: https://www.swipedon.com/>, printed May 14, 2021, 9 pages.
(Continued)

*Primary Examiner* — Binh Kien Tieu
(74) *Attorney, Agent, or Firm* — Sheppard Mullin Richter & Hampton LLP

(57) ABSTRACT

A system may include multiple remote kiosk devices each to present a respective kiosk user interface and multiple remote receptionist devices each to present a respective receptionist user interface. The system may perform operations comprising receiving at the receptionist devices live video feeds captured by the multiple kiosk devices and providing the multiple live video feeds to the remote receptionist devices. The remote receptionist devices present the multiple live video feeds in the receptionist user interfaces The system may receive, from a receptionist device, a request to initiate a video call with a remote kiosk device, may initiate a video call between the remote receptionist device and the remote
(Continued)

kiosk device, and may cause the user interface of the remote receptionist device to present the video call and the live video feeds simultaneously.

16 Claims, 10 Drawing Sheets

Related U.S. Application Data

(60) Provisional application No. 63/249,165, filed on Sep. 28, 2021.

(51) Int. Cl.
G06Q 30/02 (2023.01)
H04L 65/1096 (2022.01)
H04L 65/40 (2022.01)
H04N 1/00 (2006.01)

(52) U.S. Cl.
CPC .......... H04L 65/1096 (2013.01); H04L 65/40 (2013.01); H04N 1/00225 (2013.01); H04N 1/00233 (2013.01); H04N 1/00244 (2013.01); H04N 2201/0074 (2013.01)

(58) Field of Classification Search
CPC .. G06Q 30/0281; H04L 65/40; H04L 65/1096
USPC ........................................................ 348/14.03
See application file for complete search history.

(56) References Cited

U.S. PATENT DOCUMENTS

| | | | | |
|---|---|---|---|---|
| 10,432,807 | B1* | 10/2019 | Li | H04N 1/00493 |
| 10,516,851 | B1 | 12/2019 | Eirinberg | |
| 11,412,278 | B1* | 8/2022 | Robinson | H04L 67/52 |
| 11,516,519 | B1* | 11/2022 | Beswick | H04N 21/431 |
| 11,580,514 | B1* | 2/2023 | Whiteley | G06F 3/0488 |
| 11,743,432 | B1* | 8/2023 | Lucas | G06Q 30/0281 |
| | | | | 348/14.03 |
| 2004/0208309 | A1 | 10/2004 | Miloslavsky | |
| 2008/0255901 | A1* | 10/2008 | Carroll | G06Q 30/0241 |
| | | | | 705/1.1 |
| 2009/0070427 | A1* | 3/2009 | Gava | H04N 1/00477 |
| | | | | 709/206 |
| 2010/0246800 | A1* | 9/2010 | Geppert | H04L 12/1822 |
| | | | | 379/265.09 |
| 2011/0242317 | A1* | 10/2011 | Wengrovitz | H04N 7/181 |
| | | | | 348/E7.091 |
| 2012/0011540 | A1* | 1/2012 | Pulford | G06Q 30/0261 |
| | | | | 715/753 |
| 2012/0022983 | A1 | 1/2012 | Hughes, Jr. | |
| 2013/0030875 | A1* | 1/2013 | Lee | G06Q 30/0601 |
| | | | | 705/14.58 |
| 2013/0218917 | A1* | 8/2013 | Bell | G06F 16/93 |
| | | | | 707/756 |
| 2013/0300867 | A1 | 11/2013 | Yoder | |
| 2014/0052463 | A1* | 2/2014 | Cashman | G06Q 10/1095 |
| | | | | 705/2 |
| 2015/0052452 | A1 | 2/2015 | Alekhin | |
| 2015/0058215 | A1* | 2/2015 | Johnson | G06Q 20/1085 |
| | | | | 705/43 |
| 2015/0088694 | A1* | 3/2015 | Ackerman | G06Q 30/0641 |
| | | | | 705/28 |
| 2015/0195334 | A1 | 7/2015 | Chew | |
| 2017/0039559 | A1* | 2/2017 | Frieden | G06Q 20/40 |
| 2020/0120308 | A1* | 4/2020 | McMillan | G06F 3/017 |
| 2020/0226896 | A1 | 7/2020 | Robertson | |
| 2021/0209536 | A1 | 7/2021 | Reuveni | |
| 2021/0243332 | A1* | 8/2021 | Zhang | G06F 3/1205 |
| 2022/0253867 | A1* | 8/2022 | Mora | G06Q 30/0277 |
| 2022/0353465 | A1 | 11/2022 | Smith | |
| 2022/0369928 | A1 | 11/2022 | Ward | |
| 2023/0353712 | A1* | 11/2023 | Lucas | G06Q 10/10 |

OTHER PUBLICATIONS

The Receptionist, "The Receptionist for iPad I The Original Visitor Management System" and "Visitor Management Software Solutions I The Receptionist", online at <URL: https://thereceptionist.com> and <URL: https://thereceptionist.com/product>, printed May 14, 2021, 19 pages.

Traction Guest, "All-in-One Visitor Management System I Traction Guest", online at <URL: https://tractionguest.com/>, printed May 14, 2021, 11 pages.

* cited by examiner

INTERACTION MANAGEMENT SYSTEM FOR MULTIPLE KIOSK DEVICES AND MULTIPLE VIRTUAL RECEPTIONIST DEVICES

CROSS REFERENCE TO RELATED APPLICATIONS

The present application is a continuation of U.S. patent application Ser. No. 17/936,015, filed Sep. 28, 2022, entitled "INTERACTION MANAGEMENT SYSTEM FOR MULTIPLE KIOSK DEVICES AND MULTIPLE VIRTUAL RECEPTIONIST DEVICES", which claims priority to U.S. Provisional Patent Application No. 63/249,165, filed Sep. 28, 2021, entitled "INTERACTION MANAGEMENT SYSTEM FOR MULTIPLE KIOSK DEVICES AND MULTIPLE VIRTUAL RECEPTIONIST DEVICES", the disclosures thereof are incorporated by reference herein in their entirety.

DESCRIPTION OF RELATED ART

The disclosed technology relates to management of multiple remote kiosk devices each to present a respective kiosk user interface and multiple remote receptionist devices each to present a respective receptionist user interface with live video feeds captured by the multiple kiosk devices and management of remote calling from a kiosk device to one of the available receptionists devices.

SUMMARY

In general, one aspect disclosed features a computer-implemented method comprising: providing multiple remote kiosk devices, at one or more locations, wherein the remote kiosk devices are configured to present a respective kiosk user interface; providing multiple remote receptionist devices, wherein the remote receptionist devices are configured to present a respective remote receptionist user interface; receiving at the multiple remote receptionist devices live video feeds captured by the multiple kiosk devices, and providing some or all of the multiple live video feeds to some or all of the remote receptionist devices, wherein the remote receptionist devices present the multiple live video feeds in the respective remote receptionist user interface; receiving, from a first remote receptionist device, a request to initiate a video call with a first remote kiosk device; and responsive to receiving the request to initiate a video call with the first remote kiosk device, initiating a first video call between the first remote receptionist device and the first remote kiosk device, and causing the user interface of the first remote receptionist device to present the first video call and the live video feeds simultaneously.

Embodiments of the method may include one or more of the following features. Some embodiments comprise causing the remote receptionist user interfaces to indicate a status of some or all of the other remote receptionist devices, wherein the status indicates whether the corresponding remote receptionist device is available for a video call with one of the remote kiosk devices. Some embodiments comprise receiving, from the first remote receptionist device, a request to place the first video call on hold; and responsive to receiving the request to place the first video call on hold, placing the first video call on hold. Some embodiments comprise initiating a second video call between a second remote receptionist device and a second remote kiosk device during the first video call. Some embodiments comprise responsive to operation of the user interface of the first remote receptionist device, operating a scanner located at the location of the first remote kiosk device to scan a document, and receiving an electronic file comprising a scan of the document. Some embodiments comprise responsive to operation of the user interface of the first remote receptionist device, operating a printer located at the location of the first remote kiosk device to print a document. Some embodiments comprise sending, to the first remote kiosk device, a request for payment, wherein responsive to receiving the request for payment, the first remote kiosk device prompts the user for payment, collects payment information from a payment device at the first remote kiosk, completes payment processing, and generates a payment confirmation; and receiving the payment confirmation without receiving the payment information.

In general, one aspect disclosed features a system, comprising: a hardware processor; and a non-transitory machine-readable storage medium encoded with instructions executable by the hardware processor to perform operations comprising: communicating with multiple remote kiosk devices, wherein the remote kiosk devices are configured to present kiosk user interfaces, communicating with multiple remote receptionist devices, wherein the remote receptionist devices are configured to present remote receptionist user interfaces, receiving live video feeds captured by the multiple kiosk devices, and providing the multiple live video feeds to the remote receptionist devices, wherein the remote receptionist devices presents the multiple live video feeds in the remote receptionist user interfaces, receiving, from a first remote receptionist device, a request to initiate a video call with a first remote kiosk device, and responsive to receiving the request to initiate a video call with the first remote kiosk device, initiating a first video call between the first remote receptionist device and the first remote kiosk device, and causing the user interface of the first remote receptionist device to present the first video call and the live video feeds simultaneously.

Embodiments of the system may include one or more of the following features. In some embodiments, the operations further comprise causing the remote receptionist user interfaces to indicate a status of the other remote receptionist devices, wherein the status indicates whether the corresponding remote receptionist device is available for a video call with one of the remote kiosk devices. In some embodiments, the operations further comprise receiving, from the first remote receptionist device, a request to place the first video call on hold; and responsive to receiving the request to place the first video call on hold, placing the first video call on hold. In some embodiments, the operations further comprise initiating a second video call between a second remote receptionist device and a second remote kiosk device during the first video call. In some embodiments, the operations further comprise responsive to operation of the user interface of the first remote receptionist device, operating a scanner located at the location of the first remote kiosk device to scan a document; and receiving an electronic file comprising a scan of the document. Some embodiments comprise responsive to operation of the user interface of the first remote receptionist device, operating a printer located at the location of the first remote kiosk device to print a document. In some embodiments, the operations further comprise sending, to the first remote kiosk device, a request for payment, wherein responsive to receiving the request for payment, the first remote kiosk device prompts the user for payment, collects payment information from a payment device at the first remote kiosk, completes payment processing, and generates a payment confirmation; and receiving the payment confirmation without receiving the payment information.

In general, one aspect disclosed features a non-transitory machine-readable storage medium encoded with instructions executable by one or more hardware processors of a computing component, the machine-readable storage medium comprising instructions to cause the one or more hardware processors to perform operations comprising: communicating with multiple remote kiosk devices, wherein the remote kiosk devices are configured to present kiosk user interfaces; communicating with multiple remote receptionist devices, wherein the remote receptionist devices are configured to present remote receptionist user interfaces; receiving live video feeds captured by the multiple kiosk devices, and providing the multiple live video feeds to the remote receptionist devices, wherein remote receptionist devices present the multiple live video feeds in the remote receptionist user interfaces; receiving, from a first remote receptionist device, a request to initiate a video call with a first remote kiosk device; and responsive to receiving the request to initiate a video call with the first remote kiosk device, initiating a first video call between the first remote receptionist device and the first remote kiosk device, and causing the user interface of the first remote receptionist device to present the first video call and the live video feeds simultaneously.

Embodiments of the non-transitory machine-readable storage medium may include one or more of the following features. In some embodiments, the operations further comprise causing the remote receptionist user interfaces to indicate a status of the other remote receptionist devices, wherein the status indicates whether the corresponding remote receptionist device is available for a video call with one of the remote kiosk devices. In some embodiments, the operations further comprise receiving, from the first remote receptionist device, a request to place the first video call on hold; and responsive to receiving the request to place the first video call on hold, placing the first video call on hold. In some embodiments, the operations further comprise initiating a second video call between a second remote receptionist device and a second remote kiosk device during the first video call. In some embodiments, the operations further comprise responsive to operation of the user interface of the first remote receptionist device, operating a scanner located at the location of the first remote kiosk device to scan a document; and receiving an electronic file comprising a scan of the document. Some embodiments comprise responsive to operation of the user interface of the first remote receptionist device, operating a printer located at the location of the first remote kiosk device to print a document. In some embodiments, the operations further comprise sending, to the first kiosk receptionist device, a request for payment, wherein responsive to receiving the request for payment, the first remote kiosk device prompts the user for payment, collects payment information, completes payment processing, and generates a payment confirmation; and receiving the payment confirmation without receiving the payment information.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Receptionists have been around since the beginning of the office concept. A friendly face that can greet, direct, and perform designated business has always been at the heart of this position. While often a necessity, this position over time has had varying levels of productivity and responsibility. Additionally, this position has often been thwarted with high turnover and high absenteeism, which create great difficulty in coverage and training.

Over time, companies have used a variety of solutions from a phone to "buzz in" visitors, to self-serve computer kiosks, among other solutions. However, these solutions lacked personal interaction and thus the capabilities were limited to those programmed into the kiosk or the availability of the in-person receptionist. None of the solutions to date have combined personal contact with varying capabilities and multiple distinct coverage points on all sides of the interaction. None of the solutions on the market today allow a pool of remote receptionists to interact with a pool of remote customers at different locations. These and other drawbacks exist. Embodiments of the disclosed technologies provide such solutions.

The disclosed technology features an interaction management system that is configured to enable a pool of receptionists to interact with a pool of customers at remote locations using video calls. Each remote location may feature a kiosk device to present a kiosk user interface with which customers may interact. Each receptionist may be provided with a receptionist device with which the receptionist may interact to view video from the multiple remote locations, initiate video calls with the kiosk devices, and interact with the customers. In some embodiments, the receptionist user interface allows the receptionist to conduct a video call with a customer at one remote location while also viewing video feeds from other remote locations. The system allows each receptionist to serve customers at several or all locations instead of being physically located at and/or remotely serving only one location.

Moreover, the system enables multiple receptionists to interact independently and simultaneously with multiple customers, and to facilitate all of the functions typically performed by live, in-person receptionists, including but not limited to document scanning, printing, form completion, and payment collection. Industry settings may include, but are not limited to, healthcare, personal fitness, call centers, logistics, sports broadcasting, restaurants, hospitality/hotels, and various retail settings.

Figure 1:
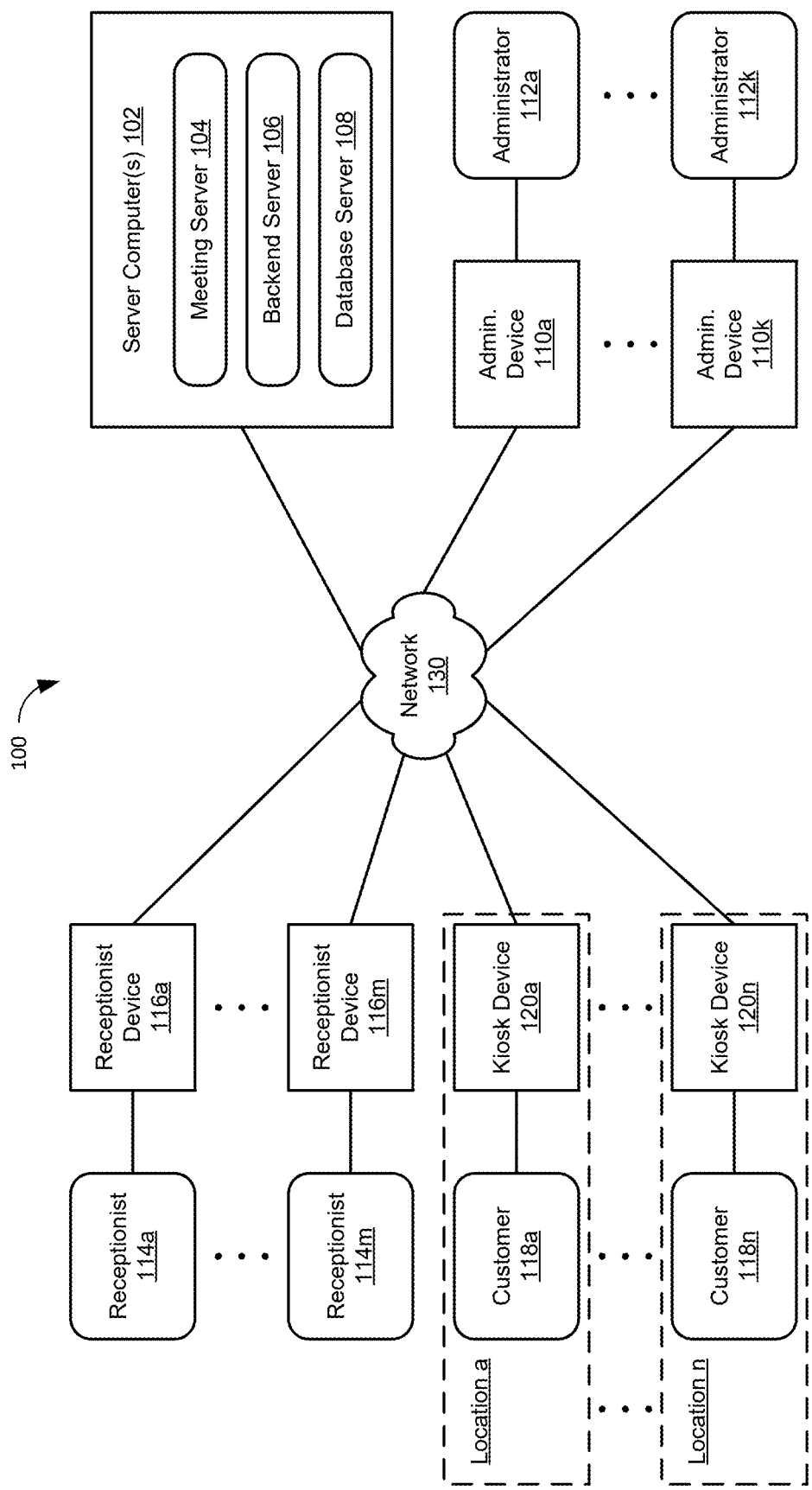
FIG. 1 is a block diagram of an interaction management system for multiple kiosk devices and multiple virtual receptionist devices according to some embodiments of the disclosed technologies.

FIG. 1 is a block diagram of an interaction management system 100 for multiple kiosk devices and multiple virtual receptionist devices according to some embodiments of the disclosed technologies. Referring to FIG. 1, the interaction management system 100 may include multiple receptionist devices 116a-m, each for use by one of multiple receptionists 114a-m. The receptionist devices 116 may be located separately, together, or some combination of locations thereof.

The interaction management system 100 may also include multiple kiosk devices 120a-n for use by customers 118a-n at remote locations a-n. Each remote location may feature one or more of the kiosk devices 120.

The interaction management system 100 may include one or more administrator devices 110a-k, each for use by an administrator 112a-k to manage the system 100. The receptionist devices 116, the kiosk devices 120, and the administrator devices 110 may be implemented as electronic computing devices. By way of nonlimiting example, the electronic computing devices may include desktop computers, laptop computers, tablets, and smartphones. The receptionist devices 116, and the kiosk devices 120, may include cameras and microphones. The kiosk devices 120 may include, or be accompanied by, one or more peripheral devices. The peripheral devices may include printers, scanners, and payment devices. The payment devices may include credit card readers, near field communications (NFC) devices, and similar payment devices.

The interaction management system 100 may include one or more server computers 102. The server computer(s) 102 may host one or more servers. The hosted servers may include a meeting server 104, a backend server 106, and the database server 108. The meeting server 104 may manage the audio and video feeds described herein. In some embodiments, the meeting server 104 may be implemented using the jitsi meet$^{SM}$ service. The database server 108 may handle the stored data employed by the system. In some embodiments, the database server 108 may be implemented using MySQL$^{SM}$. The backend server 106 may handle backend tasks not directly related to media management. In some embodiments, the backend server 106 may be implemented using Node.js®.

The server computer(s) 102, administrator devices 110, receptionist devices 116, and kiosk devices 120 may communicate over one or more networks 130. The devices may employ a Virtual Network Computing (VNC) tool having a virtual private network (VPN) feature. A receptionist may connect to a kiosk device 120 while on a call with a location using the VNC tool. Once connected, the receptionist may have full host control over the kiosk device 120, giving them access to local hardware such as printers, scanners, credit card terminals, thus allowing for remote deployment of the local hardware.

Figure 2:
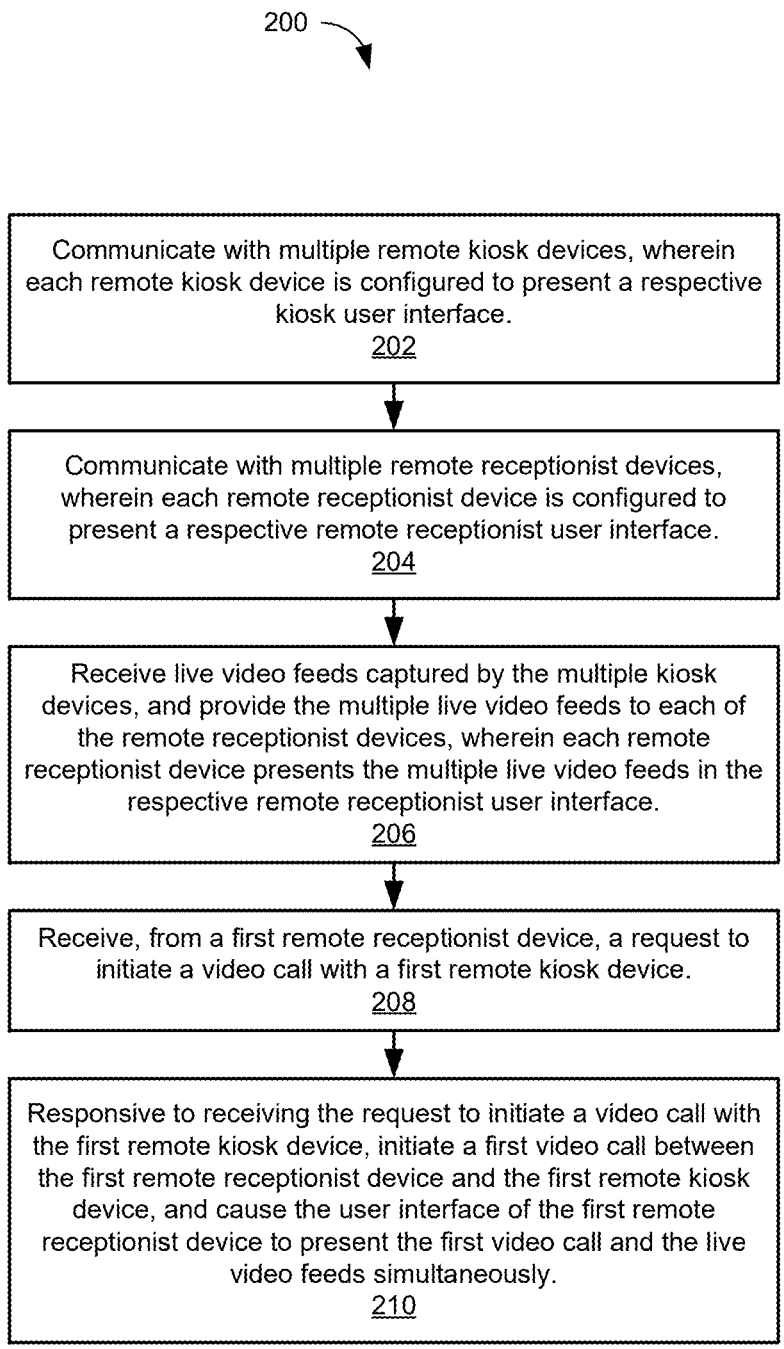
FIG. 2 is a flowchart illustrating a process for managing interactions between multiple kiosk devices and multiple virtual receptionist devices.

FIG. 2 is a flowchart illustrating a process 200 for managing interactions between multiple kiosk devices and multiple virtual receptionist devices. The process 200 may be implemented by the server computer(s) 102 of the interaction management system 100 of FIG. 1. The elements of the process 200 are presented in one arrangement. However, it should be understood that one or more elements of the process may be performed in a different order, in parallel, omitted entirely, and the like. Furthermore, the process 200 may include other elements in addition to those presented. For example, the process 200 may include error-handling functions if exceptions occur, and the like.

Figure 3:
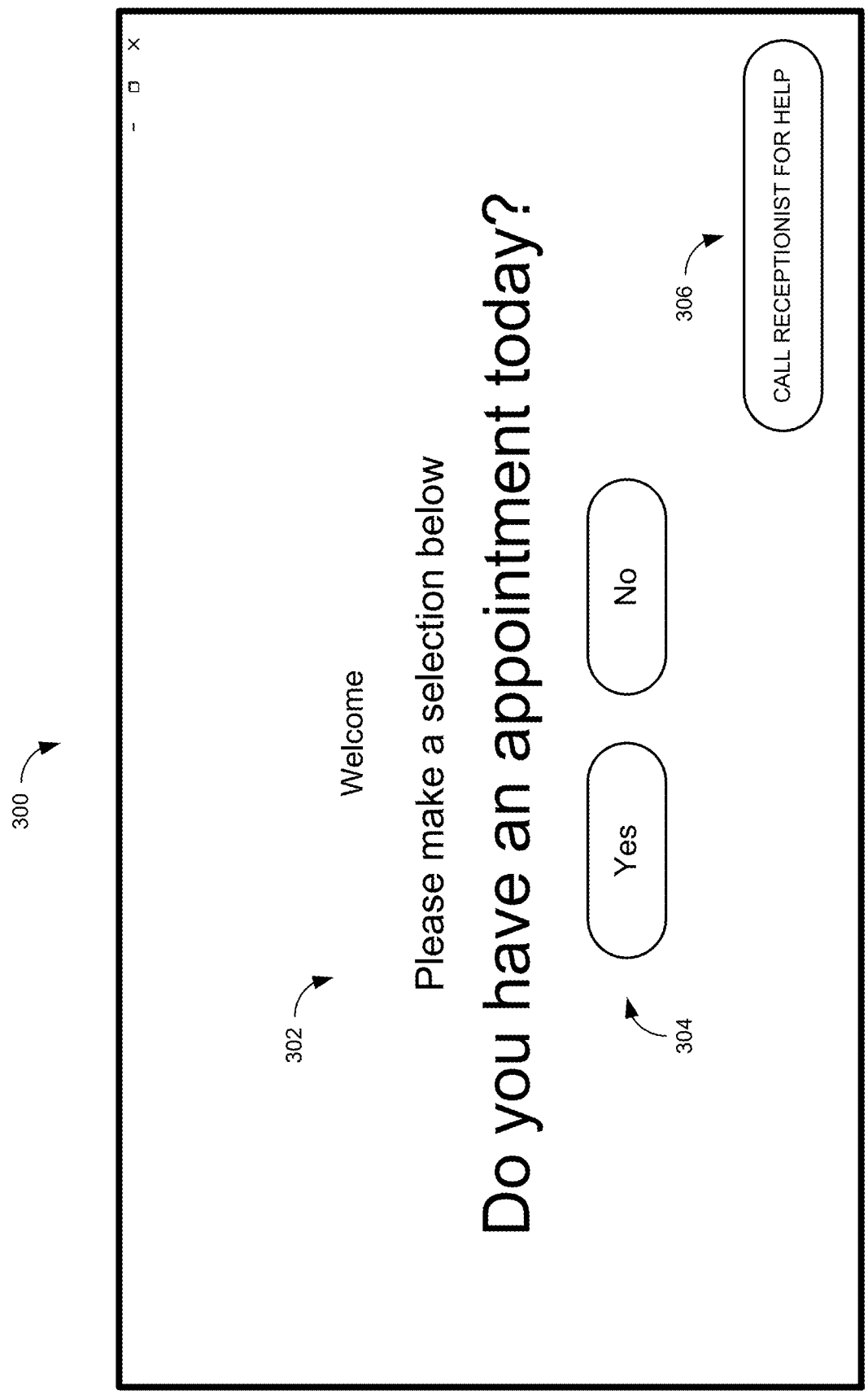
FIG. 3 illustrates an example initial remote kiosk user interface according to some embodiments of the disclosed technologies.

Referring to FIG. 2, the process 200 may include communicating with multiple remote kiosk devices, wherein each remote kiosk device is configured to present a respective kiosk user interface, at 202. FIG. 3 illustrates an example initial remote kiosk user interface 300 according to some embodiments of the disclosed technologies. Referring to FIG. 3, the remote kiosk user interface 300 may include a number of display elements.

The display elements may include a welcome message, at 302. The welcome message may ask whether the customer has an appointment. The display elements may include yes and no buttons for the customer to respond, at 304. The display elements may include a button to call a receptionist for help, at 306.

Figure 4:
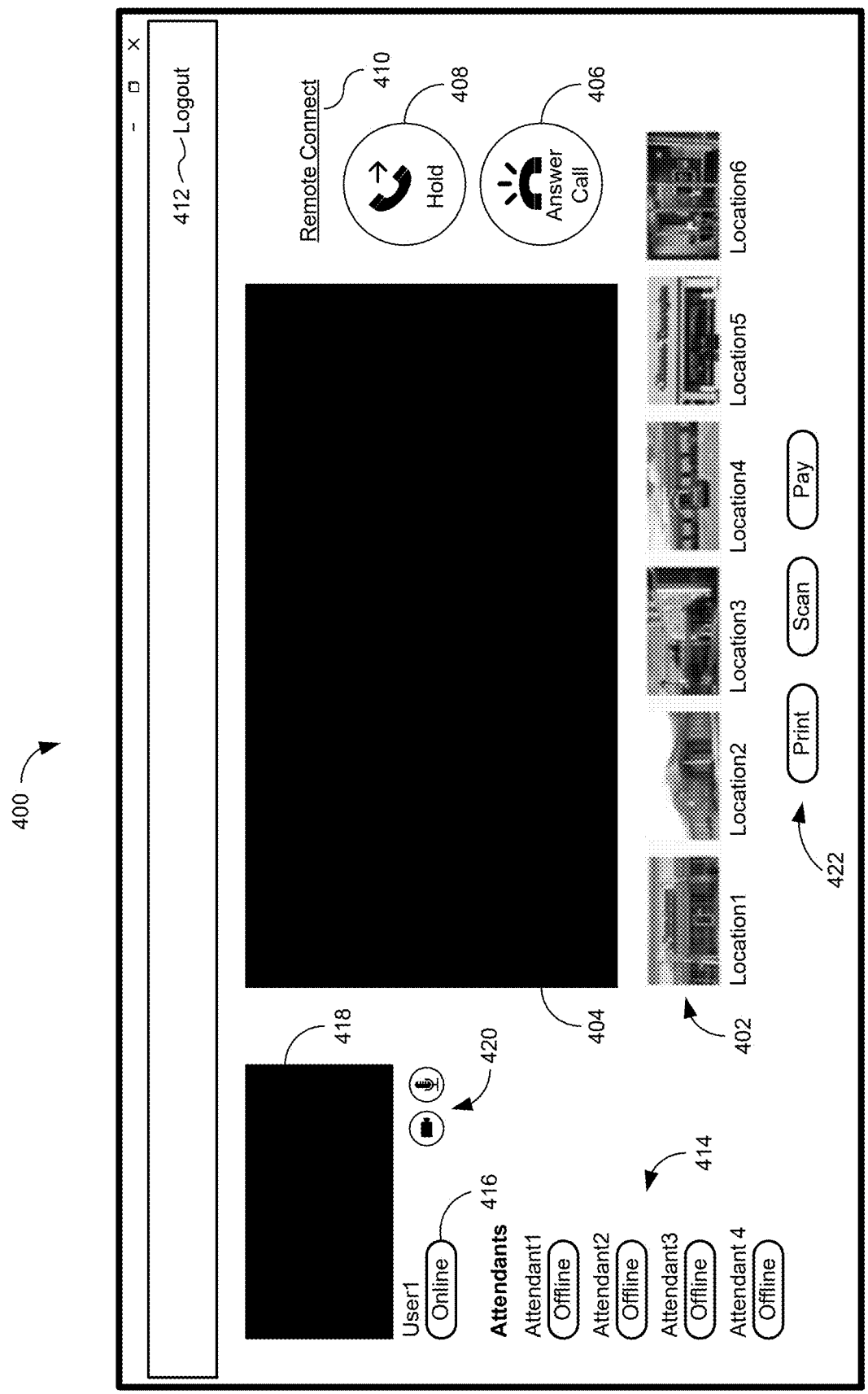
FIG. 4 illustrates an example initial remote receptionist user interface according to some embodiments of the disclosed technologies.

Referring again to FIG. 2, the process 200 may include communicating with multiple remote receptionist devices, wherein each remote receptionist device is configured to present a respective remote receptionist user interface, at 204. FIG. 4 illustrates an example initial remote receptionist user interface 400 according to some embodiments of the disclosed technologies. Referring to FIG. 4, the remote receptionist user interface 400 may include a number of display elements.

The display elements may include a location video feed area 402. The video feed for a location may present video of the interior and/or exterior of the location, allowing the remote receptionists to see people entering/leaving the location. These video feeds may be one-way so the receptionists can see multiple video feeds, but people at the location cannot see or hear the receptionists. When the presence of a customer is detected at a location, the video feed for that location may switch to a video of the customer.

The display elements may include a video call panel 404. When a video call is initiated, video of the video call may be presented in the video call panel 404.

Figure 5:
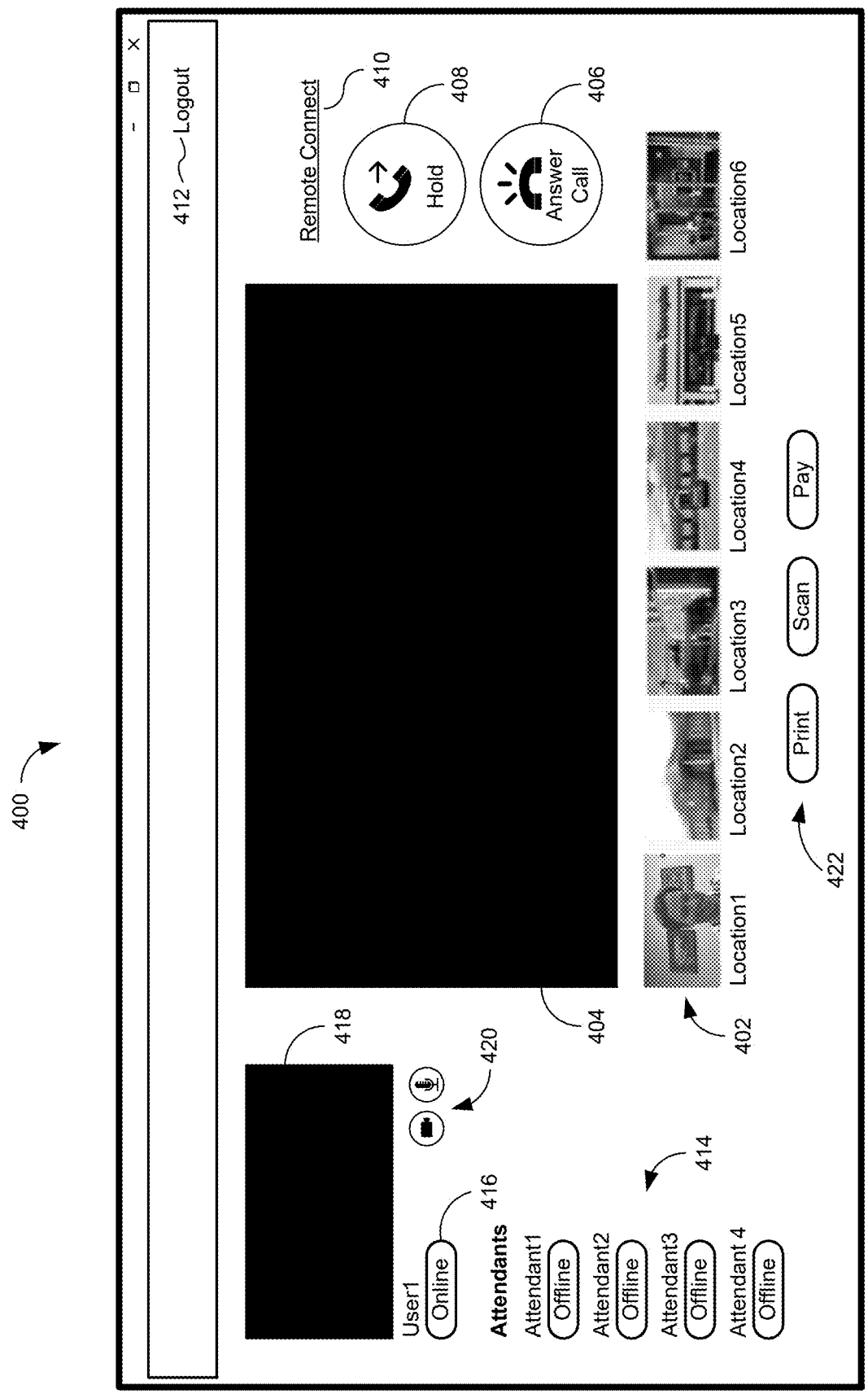
FIG. 5 illustrates an example remote receptionist user interface that presents video of the customer for multiple remote locations.

The display elements may include an answer call button 406. In the example of FIG. 3, when a customer operates the no button, at 304, or the call receptionist button, at 306, the customer may be placed in a queue for a video call. While in the queue, video of the customer may be presented in the location video feed area 402 of the remote receptionist user interfaces 400 for multiple remote receptionists, as illustrated in FIG. 5 for Location1. Any of the remote receptionists may answer the video call by operating the answer call button 406, or by selecting the thumbnail of that location in the location video feed area 402.

The display elements may include a hold button 408. At any time during a video call, a remote receptionist may operate the hold button to place the video call on hold, and to release the hold. Responsive to operation of the hold button, the remote receptionist device may send a request to the server computer(s) 102. Responsive to receiving the request to place the video call on hold, the server computer(s) 102 may place the video call on hold, for example by muting the microphones and stopping the video feeds at one or both of the remote kiosk device and the remote receptionist device. While a video call is on hold, a remote receptionist may answer another video call, or confer with another remote receptionist.

The display elements may include a remote connect link 410. The display elements may include status indicators for other remote receptionists, at 414. For each of the remote receptionists, also referred to as attendants, the status indicator may indicate one of multiple statuses. The status may indicate whether the corresponding remote receptionist device is available for a video call with one of the remote kiosk devices. For example, the statuses may include online, offline, on call, and away. The status indicators may be color-coded for quick reference.

The display elements may include a status indicator for the remote receptionist operating the remote receptionist user interface, at 416. This status indicator may be as described above for the other receptionists.

The display elements may include a local video feed panel, at 418. The local video feed may present the video captured by the remote receptionist device, so the receptionist may see the video of the receptionist as presented at the kiosk.

The display elements may include local video and audio control buttons, at 420. The remote receptionist may operate these buttons to stop the local video feed and mute the local microphone.

The display elements may include peripheral control buttons, at 422. For example, the peripheral control buttons may include buttons to print, scan, and pay. The remote receptionist may use the peripheral control buttons to operate peripherals at the location of the remote kiosk device.

In some embodiments, the display elements may include buttons to control additional devices at the remote kiosk location. For example, these devices may include door locks, alarms, lights, and similar devices. In some embodiments, the display elements may include buttons to summon emergency personnel to the location, for example by calling 911.

The display elements may include a login/logout button 412. When the remote receptionist is logged out, the status indicator for that remote receptionist may appear as offline to other receptionists.

Referring again to FIG. 2, the process 200 may include receiving live video feeds captured by the multiple kiosk devices, and providing the multiple live video feeds to each of the remote receptionist devices, wherein each remote receptionist device presents the multiple live video feeds in the respective remote receptionist user interface, at 206. In the example of FIG. 4, these video feeds may be presented in the location video feed area 402.

Referring again to FIG. 2, the process 200 may include receiving, from a first remote receptionist device, a request to initiate a video call with a first remote kiosk device, at 208. The request may be initiated by a remote receptionist device responsive to selection of the thumbnail of the customer in the location video feed area 402. The features enable any receptionist to work with any customer.

Figure 6:
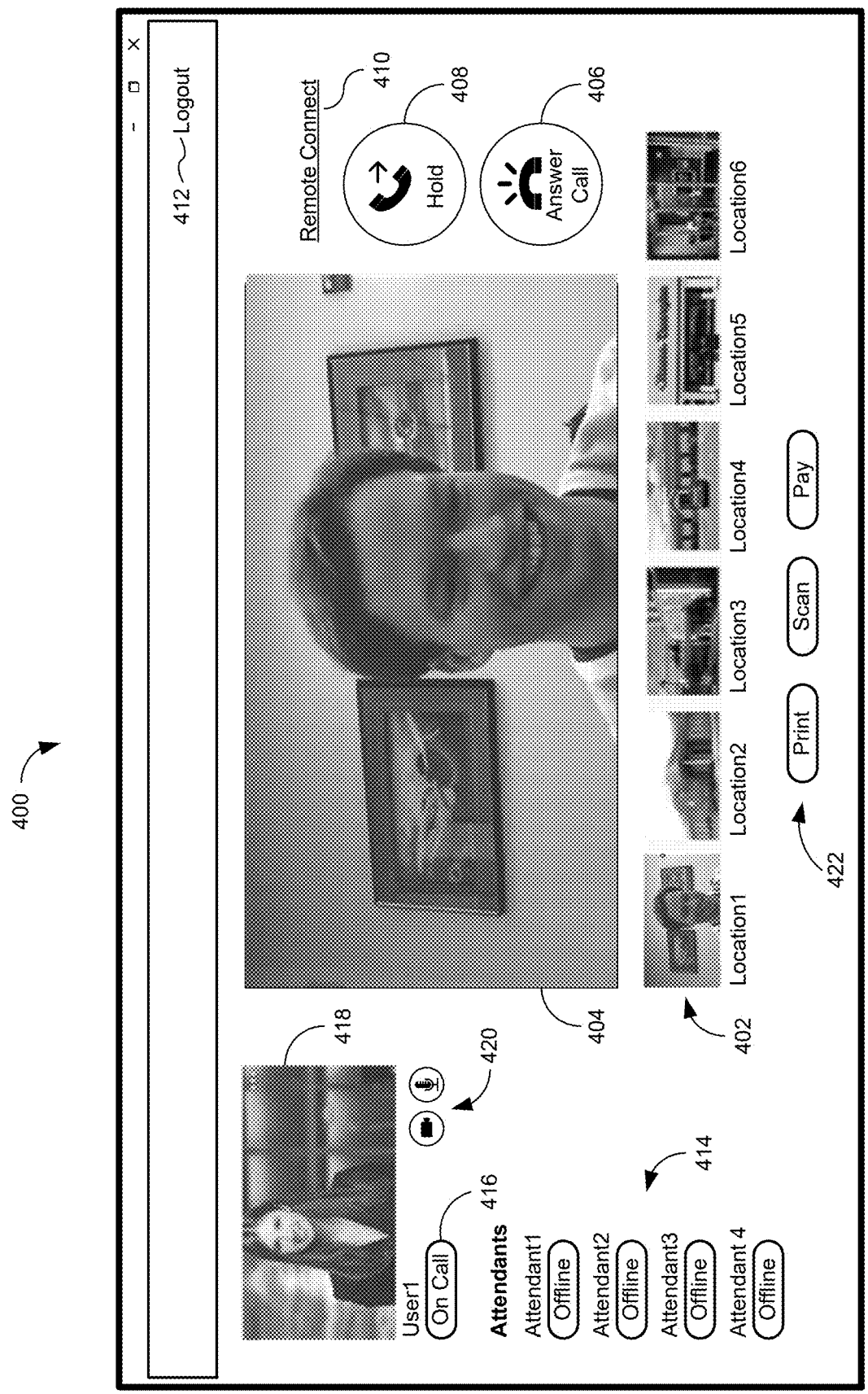
FIG. 6 illustrates an example remote receptionist user interface that presents videos of the customer and receptionist.

Referring again to FIG. 2, the process 200 may include, responsive to receiving the request to initiate a video call with the first remote kiosk device, initiating a first video call between the first remote receptionist device and the first remote kiosk device, and causing the user interface of the first remote receptionist device to present the first video call and the live location video feeds simultaneously, at 210. This process differs from conventional meeting software where the 1:1 conversation would be moved out of the main meeting session and into a private breakout room, and the participants would lose the ability to continue to interact in the main session. For example, referring to FIG. 6, video of the customer may be presented in the video call panel 404, video of the remote receptionist may be presented in the local video feed panel 418, and the status indicator for the remote receptionist may be changed to indicate a status of on call, both at 416 in the local receptionist user interface, and at 414 in the user interfaces of other remote receptionists.

Figure 7:
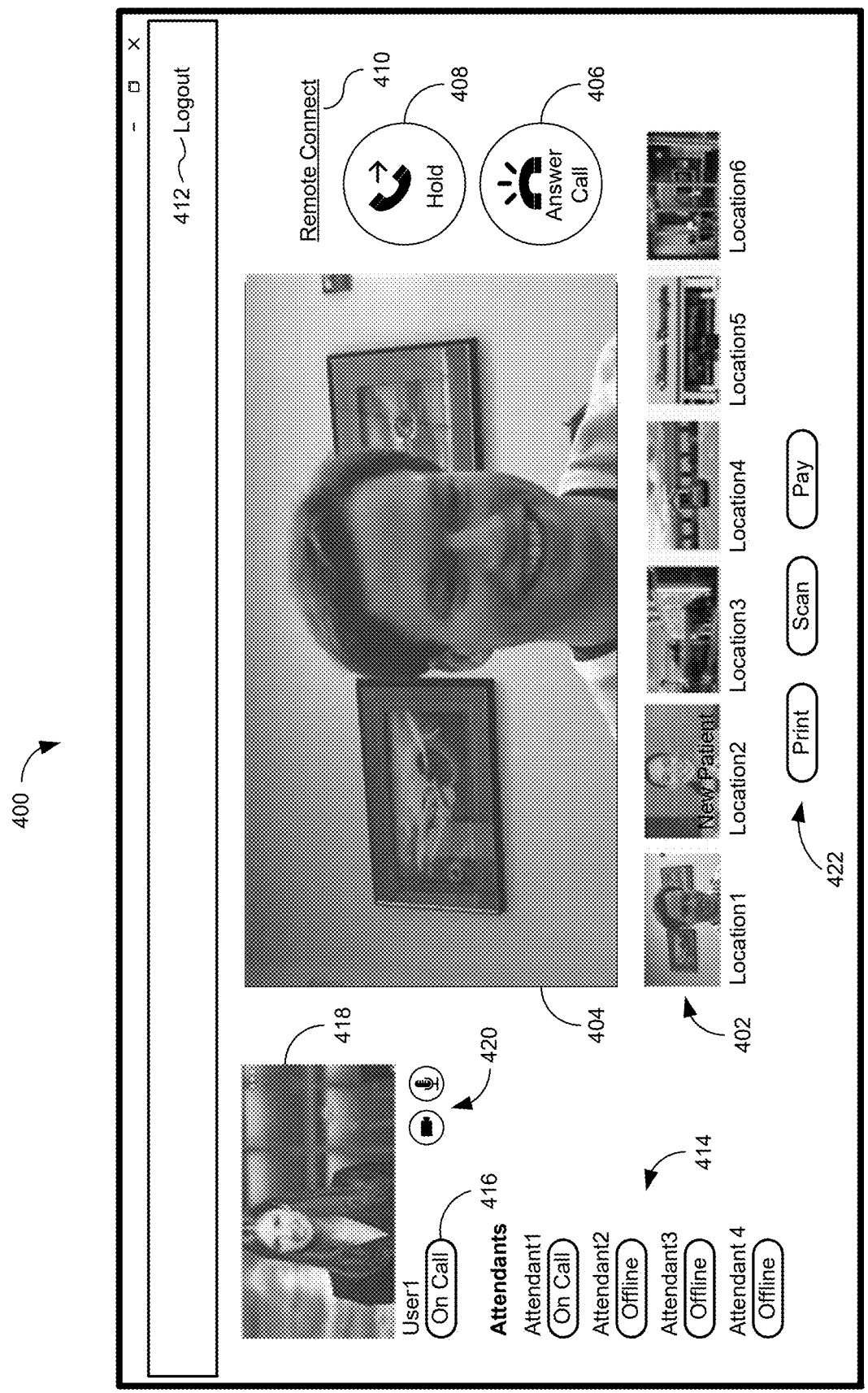
FIG. 7 illustrates an example remote receptionist user interface that presents video of the customer in the second video call to other remote receptionists.

The system allows multiple video calls to take place simultaneously. For example, during a first video call, a second video call may take place, and video of the customer in the second video call may be presented to other remote receptionists in the location video feed area 402 of user interface of the remote receptionist in the first video call. FIG. 7 illustrates this feature for the video call of FIG. 6. Referring to FIG. 7, the video feed of another call is presented in the location video feed area 402 for Location2. A banner may overlay the video feed of the second video call to indicate the type of that call. In the example of FIG. 7, the type of call is indicated as new patient. The status indicator of Attendant1 has been changed to on call to indicate that Attendant1 is handling the second video call.

Figure 8:
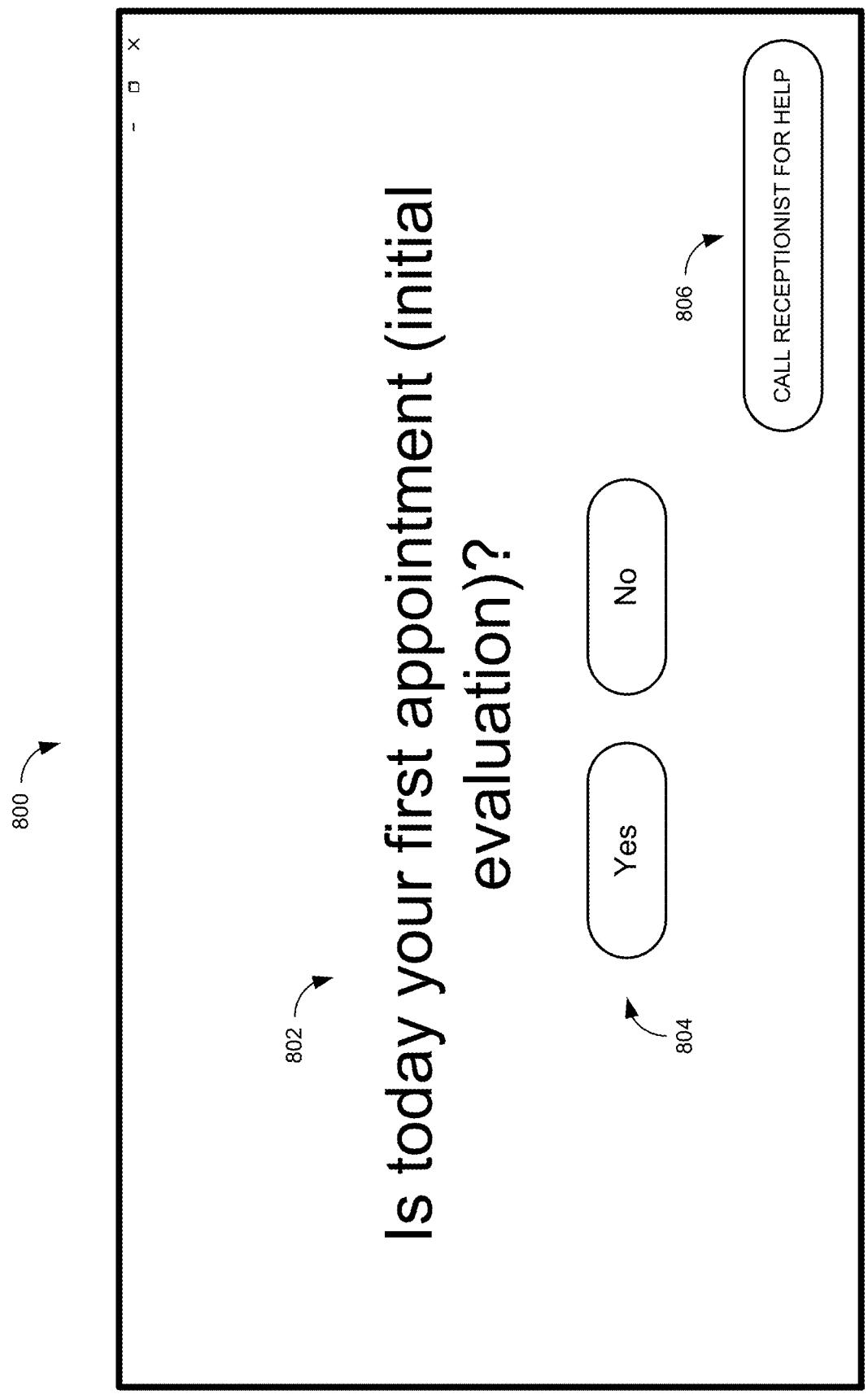
FIG. 8 illustrates an example initial kiosk user interface for guiding the customer through a check-in procedure.

In some embodiments, the user interface of the remote kiosk device may guide the customer through a check-in procedure. In the example of FIG. 3, responsive to the customer indicating they do not have an appointment, the user interface 300 of the remote kiosk device may present the screen 800 shown in FIG. 8. Referring to FIG. 8, the screen 800 may present the message "Is today your first appointment (initial evaluation)?", at 802. The screen 800 may include yes and no buttons for the customer to respond, at 804, and a button to call a receptionist for help, at 806. When the customer operates the yes button, at 804, or the call receptionist button, at 806, the customer may be placed in a queue for a video call.

Figure 9:
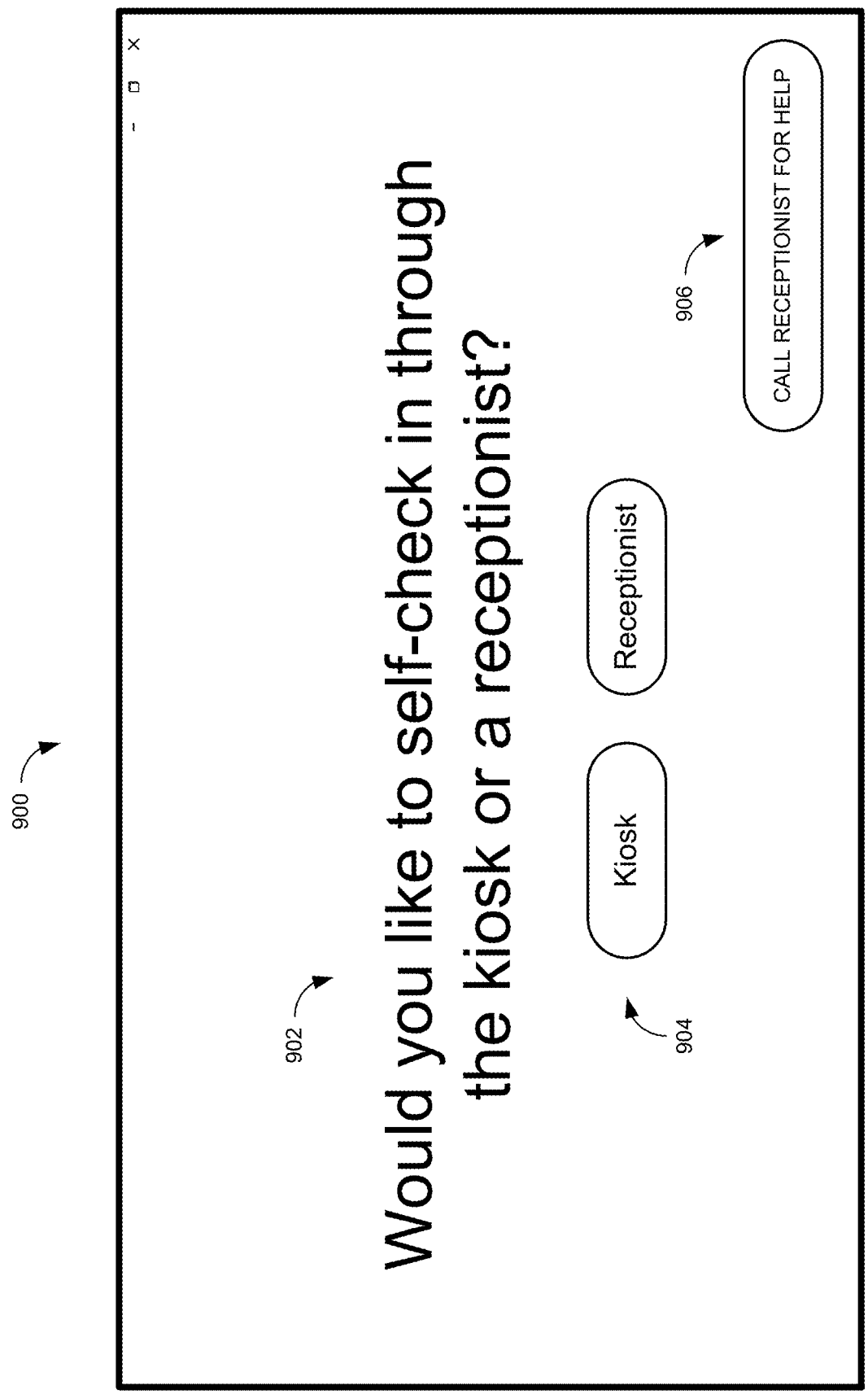
FIG. 9 illustrates an example subsequent kiosk user interface for guiding the customer through a check-in procedure.

Alternatively, when the customer operates the yes button, at 804, the user interface 300 of the remote kiosk device may present the screen 900 shown in FIG. 9. Referring to FIG. 9, the screen 900 may present the message "Would you like to self-check in through the kiosk or a receptionist?", at 902. The screen 900 may include kiosk and receptionist buttons for the customer to respond, at 904, and a button to call a receptionist for help, at 906. When the customer operates the receptionist button, at 904, or the call receptionist button, at 906, the customer may be placed in a queue for a video call. Alternatively, when the customer operates the kiosk button, at 904, the user interface 300 of the remote kiosk device may present one or more self-check in screens, or may direct the customer to a separate self-check in kiosk to complete the check-in process. After a predetermined interval, the remote kiosk device may reset to the initial welcome screen for the next customer.

In some embodiments, the receptionists have no direct or remote control over the peripheral devices at the kiosks residing in remote locations. Such embodiments may include features by which control of these remote hardware devices is possible. For example, session communications may be established between receptionists and location hardware using JSON, XML, or other methods of data exchange. These methods may allow printing of documents from the receptionist's computer, or directly from any other software package on the remote computer, to a remote printer at the remote kiosk. A similar approach may involve the scanning of documents from a scanner device physically connected to the remote kiosk. These techniques allow the receptionists to choose options for the peripheral devices. The options may include single or double sided scans, card or full size documents, color or black and white printing, as well as the selection of any other parameters required by the scanning interface. For example, these techniques may employ TWAIN, ISIS, or WIA methods.

Integration of the interaction management system with kiosk peripherals such as credit card terminals and processors is made possible by communication between the interaction management system and third party software providers, often referred to as "middle-ware" software providers. The interaction management system may submit a request for a payment and an amount through an API call to the middle-ware software. The middle-ware software may then communicate directly to the remote credit card reader and the credit card processor. All communication may be encrypted, and may meet full PCI standards requirements. Thus, the interaction management system is able to request payments, and receives information only as to whether the transaction was accepted or declined, without ever handling data related to the actual card process.

The disclosed technologies provide numerous advantages in comparison with conventional solutions. Extended hours coverage, lunchtime coverage, and sick/vacation coverage may be provided without the onerous physical movement of staff. Because in-person interaction is eliminated, unprecedented safety is provided for the receptionists, with no contamination, handling of papers, credit cards, checks, etc. Instead, all of these functions are performed virtually.

In some embodiments, the disclosed technologies are HIPAA-compliant as each location interaction is private, and not open to any other location or attendant other than when directly interacting. The system has no functionality to record user information or video calls. The system requires no user information, and no user information is passed as a parameter. Documents may be uploaded from peripheral devices at the kiosk location directly into the cloud where they can be securely accessed and placed into individual secure electronic medical records. In the medical industry, having the front desk offsite has been shown to reduce "office drama" and maximize scheduling as there are no discrete avenues for abuses such as the inappropriate cancellation of appointments or creation of dummy appointments by a reception to leave work early or change production standards.

Figure 10:
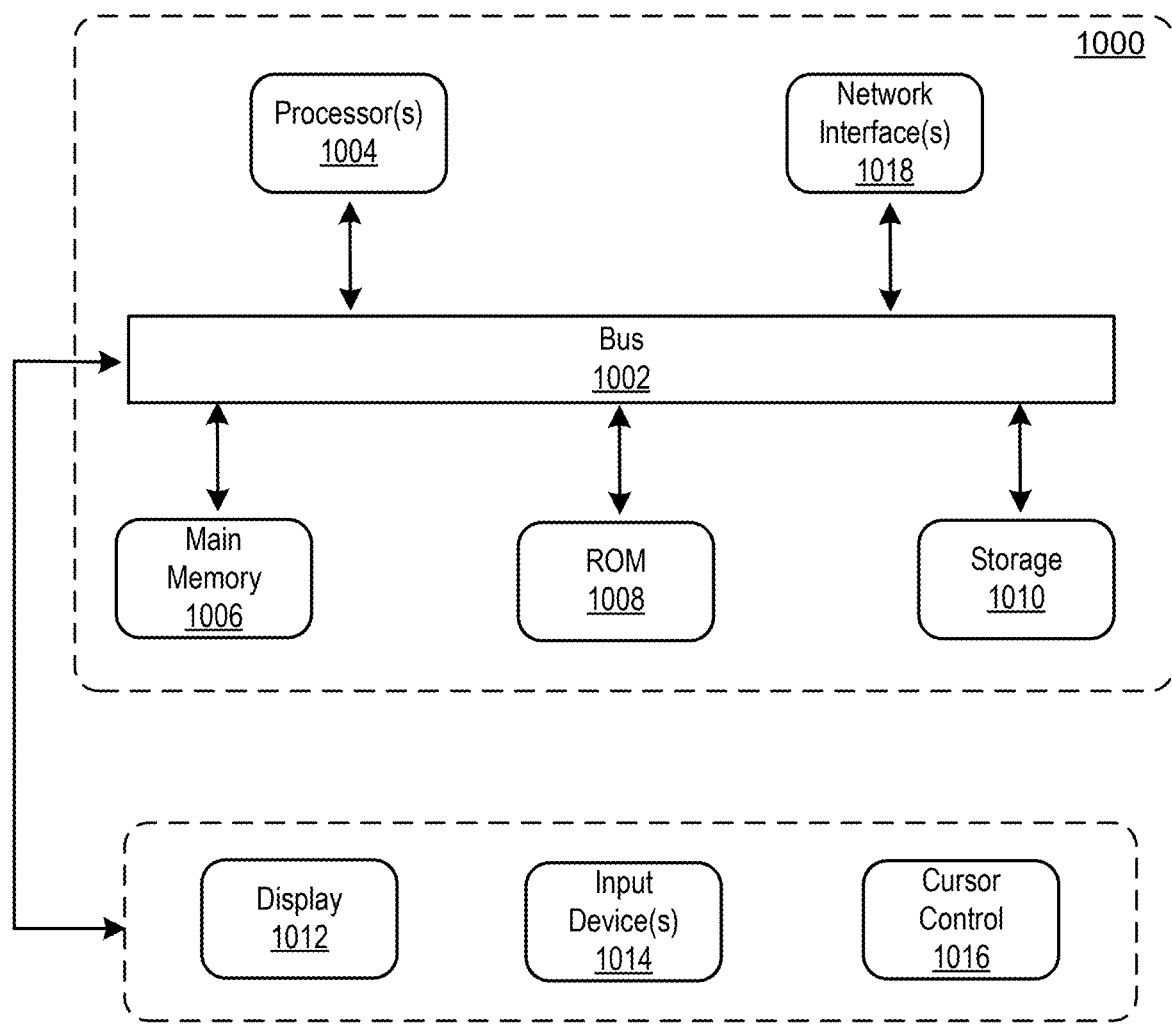
FIG. 10 depicts a block diagram of an example computer system in which embodiments described herein may be implemented.

FIG. 10 depicts a block diagram of an example computer system 1000 in which embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or a WAN component to communicate with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICS, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1000.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method for managing interactions between kiosk devices and virtual receptionist devices comprising:
providing multiple remote kiosk devices, wherein the remote kiosk devices are configured to present respective kiosk user interfaces;
providing multiple remote receptionist devices, wherein the remote receptionist devices are configured to present respective remote receptionist user interfaces;
receiving, at multiple ones of the remote receptionist devices, live video feeds captured by the multiple remote kiosk devices, and providing multiple live video feeds to the multiple ones of the remote receptionist devices, wherein the multiple ones of the remote receptionist devices present multiple live video feeds in the respective remote receptionist user interfaces;
managing, simultaneous and independent interactions between the multiple remote kiosk devices and at least a first remote receptionist device based on the multiple live video feeds, wherein a user interface of the first remote reception device allows the first remote reception device to interact independently and simultaneously with the multiple remote kiosk devices;
further comprising:
initiating a first video call between a first remote receptionist device and a first remote kiosk device;
causing the user interface of the first remote receptionist device to present the first video call and the live video feeds simultaneously, wherein the user interface allows the first remote receptionist device to interact independently and simultaneously with a second remote kiosk device;
and in response to initiating or ending a video call, causing the respective remote receptionist user interfaces to indicate a status of other ones of the remote receptionist devices, wherein the status indicates availability of a respective remote receptionist device to answer a subsequent video call and availability of the other ones of the remote receptionist devices to initiate the subsequent video call, wherein the status is displayed at a corresponding remote user interface of the respective remote receptionist device and at respective remote receptionist user interfaces of the other ones of the remote receptionist devices.

2. The computer-implemented method of claim 1, further comprising:
receiving, from the first remote receptionist device, a request to place the first video call on hold; and
responsive to receiving the request to place the first video call on hold, placing the first video call on hold.

3. The computer-implemented method of claim 1, further comprising:
initiating a second video call between a second remote receptionist device and the second remote kiosk device during the first video call.

4. The computer-implemented method of claim 1, further comprising:
responsive to operation of the user interface of the first remote receptionist device, operating a scanner located at the location of the first remote kiosk device to scan a document; and
receiving an electronic file comprising a scan of the document.

5. The computer-implemented method of claim 1, further comprising:
responsive to operation of the user interface of the first remote receptionist device, operating a printer located at the location of the first remote kiosk device to print a document.

6. A system, for managing interactions between kiosk devices and virtual receptionist devices comprising:
one or more hardware processor; and
one or more non-transitory machine-readable storage media encoded with instructions executable by the one or more hardware processors to perform operations comprising:
communicating with multiple remote kiosk devices, wherein the remote kiosk devices are configured to present a respective kiosk user interface,
communicating with multiple remote receptionist devices, wherein the remote receptionist devices are configured to present a respective remote receptionist user interface,
receiving multiple live video feeds captured by the multiple remote kiosk devices, and providing multiple live video feeds to multiple ones of the multiple remote receptionist devices, wherein the multiple ones of the remote receptionist devices present the multiple live video feeds in respective remote receptionist user interfaces,
managing, simultaneous and independent interactions between the multiple remote kiosk devices and at least a first remote receptionist device based on the multiple live video feeds, wherein a user interface of the first remote reception device allows the first remote reception device to interact independently and simultaneously with the multiple remote kiosk devices,
initiating a first video call between a first remote receptionist device and a first remote kiosk device;
causing the user interface of the first remote receptionist device to present the first video call and the live video feeds simultaneously, wherein the user interface allows the first remote receptionist device to interact independently and simultaneously with a second remote kiosk device; and
in response to initiating or ending a video call, causing the respective remote receptionist user interfaces to indicate a status of other ones of the remote receptionist devices, wherein the status indicates availability of a respective remote receptionist device to answer a subsequent video call and availability of the other ones of the remote receptionist devices to initiate the subsequent video call, wherein the status is displayed at a corresponding remote user interface of the respective remote receptionist device and at respective remote receptionist user interfaces of the other ones of the remote receptionist devices.

7. The system of claim 6, the operations further comprising:
receiving, from the first remote receptionist device, a request to place the first video call on hold; and
responsive to receiving the request to place the first video call on hold, placing the first video call on hold.

8. The system of claim 6, the operations further comprising:
initiating a second video call between a second remote receptionist device and the second remote kiosk device during the first video call.

9. The system of claim 6, the operations further comprising:
- responsive to operation of the user interface of the first remote receptionist device, operating a scanner located at the location of the first remote kiosk device to scan a document; and
- receiving an electronic file comprising a scan of the document.

10. The system of claim 6, the operations further comprising:
- responsive to operation of the user interface of the first remote receptionist device, operating a printer located at the location of the first remote kiosk device to print a document.

11. One or more non-transitory machine-readable storage media encoded with instructions executable by one or more hardware processors of a computing component to cause the one or more hardware processors to perform operations comprising:
- communicating with multiple remote kiosk devices, wherein the remote kiosk devices are configured to present a respective kiosk user interface;
- communicating with multiple remote receptionist devices, wherein the remote receptionist devices are configured to present a respective remote receptionist user interface;
- receiving multiple live video feeds captured by the multiple remote kiosk devices, and providing multiple live video feeds to multiple ones of the multiple remote receptionist devices, wherein the multiple ones of the multiple remote receptionist devices present the multiple live video feeds in respective remote receptionist user interfaces;
- managing, simultaneous and independent interactions between the multiple remote kiosk devices and at least a first remote receptionist device based on the multiple live video feeds, wherein a user interface of the first remote reception device allows the first remote reception device to interact independently and simultaneously with the multiple remote kiosk devices;
- initiating a first video call between a first remote receptionist device and a first remote kiosk device;
- causing the user interface of the first remote receptionist device to present the first video call and the multiple live video feeds simultaneously, wherein the user interface allows the first remote receptionist device to interact independently and simultaneously with a second remote kiosk device; and
- in response to initiating or ending a video call, causing the respective remote receptionist user interfaces to indicate a status of other ones of the remote receptionist devices, wherein the status indicates availability of a respective remote receptionist device to answer a subsequent video call and availability of the other ones of the remote receptionist devices to initiate the subsequent video call, wherein the status is displayed at a corresponding remote user interface of the respective remote receptionist device and at respective remote receptionist user interfaces of the other ones of the remote receptionist devices.

12. The one or more non-transitory machine-readable storage media of claim 11, the operations further comprising:
- receiving, from the first remote receptionist device, a request to place the first video call on hold; and
- responsive to receiving the request to place the first video call on hold, placing the first video call on hold.

13. The one or more non-transitory machine-readable storage media of claim 11, the operations further comprising:
- initiating a second video call between a second remote receptionist device and the second remote kiosk device during the first video call.

14. The one or more non-transitory machine-readable storage media of claim 11, the operations further comprising:
- responsive to operation of the user interface of the first remote receptionist device, operating a scanner located at the location of the first remote kiosk device to scan a document; and
- receiving an electronic file comprising a scan of the document.

15. A computer-implemented method for managing interactions between kiosk devices and virtual receptionist devices comprising:
- providing multiple remote kiosk devices, wherein the remote kiosk devices are configured to present respective kiosk user interfaces;
- providing multiple remote receptionist devices, wherein the remote receptionist devices are configured to present respective remote receptionist user interfaces;
- receiving, at multiple ones of the remote receptionist devices, live video feeds captured by the multiple remote kiosk devices, and providing multiple live video feeds to the multiple ones of the remote receptionist devices, wherein the multiple ones of the remote receptionist devices present multiple live video feeds in the respective remote receptionist user interfaces;
- managing, simultaneous and independent interactions between the multiple remote kiosk devices and at least a first remote receptionist device based on the multiple live video feeds, wherein a user interface of the first remote reception device allows the first remote reception device to interact independently and simultaneously with the multiple remote kiosk devices,
- wherein the respective remote receptionist user interfaces further comprise: one or more display elements in a local video feed panel operable by a respective remote receptionist device to stop at least one of the multiple live video feeds captured by the multiple remote kiosk devices and mute a local microphone of the multiple remote kiosk devices.

16. A computer-implemented method for managing interactions between kiosk devices and virtual receptionist devices comprising:
- providing multiple remote kiosk devices, wherein the remote kiosk devices are configured to present respective kiosk user interfaces;
- providing multiple remote receptionist devices, wherein the remote receptionist devices are configured to present respective remote receptionist user interfaces;
- receiving, at multiple ones of the remote receptionist devices, live video feeds captured by the multiple remote kiosk devices, and providing multiple live video feeds to the multiple ones of the remote receptionist devices, wherein the multiple ones of the remote receptionist devices present multiple live video feeds in the respective remote receptionist user interfaces;
- managing, simultaneous and independent interactions between the multiple remote kiosk devices and at least a first remote receptionist device based on the multiple live video feeds, wherein a user interface of the first remote reception device allows the first remote reception device to interact independently and simultaneously with the multiple remote kiosk devices;

initiating a first video call between a first remote receptionist device and a first remote kiosk device;

causing the user interface of the first remote receptionist device to present the first video call and the live video feeds simultaneously, wherein the user interface allows the first remote receptionist device to interact independently and simultaneously with a second remote kiosk device;

initiating a second video call between the first remote receptionist device and a second remote kiosk device during the first video call; and presenting the second video call to other remote receptionist devices in a location vie feed area of the user interface of the first remote receptionist device in the first video call.

* * * * *